L. F. McFARLAND AND P. B. BODEN.
HARROW CART.
APPLICATION FILED APR. 19, 1921.
1,413,044.
Patented Apr. 18, 1922.
3 SHEETS—SHEET 3.
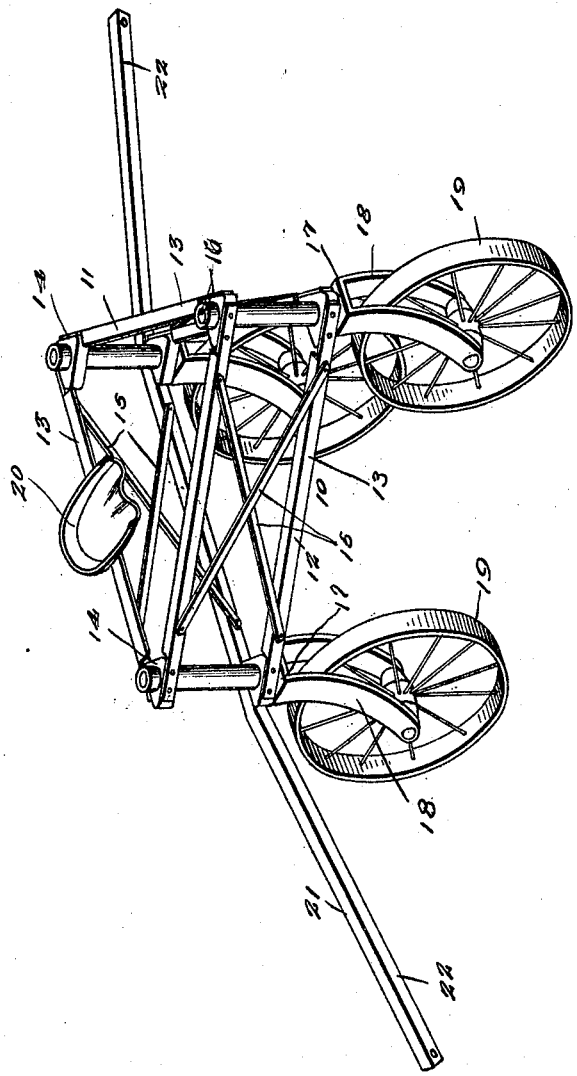

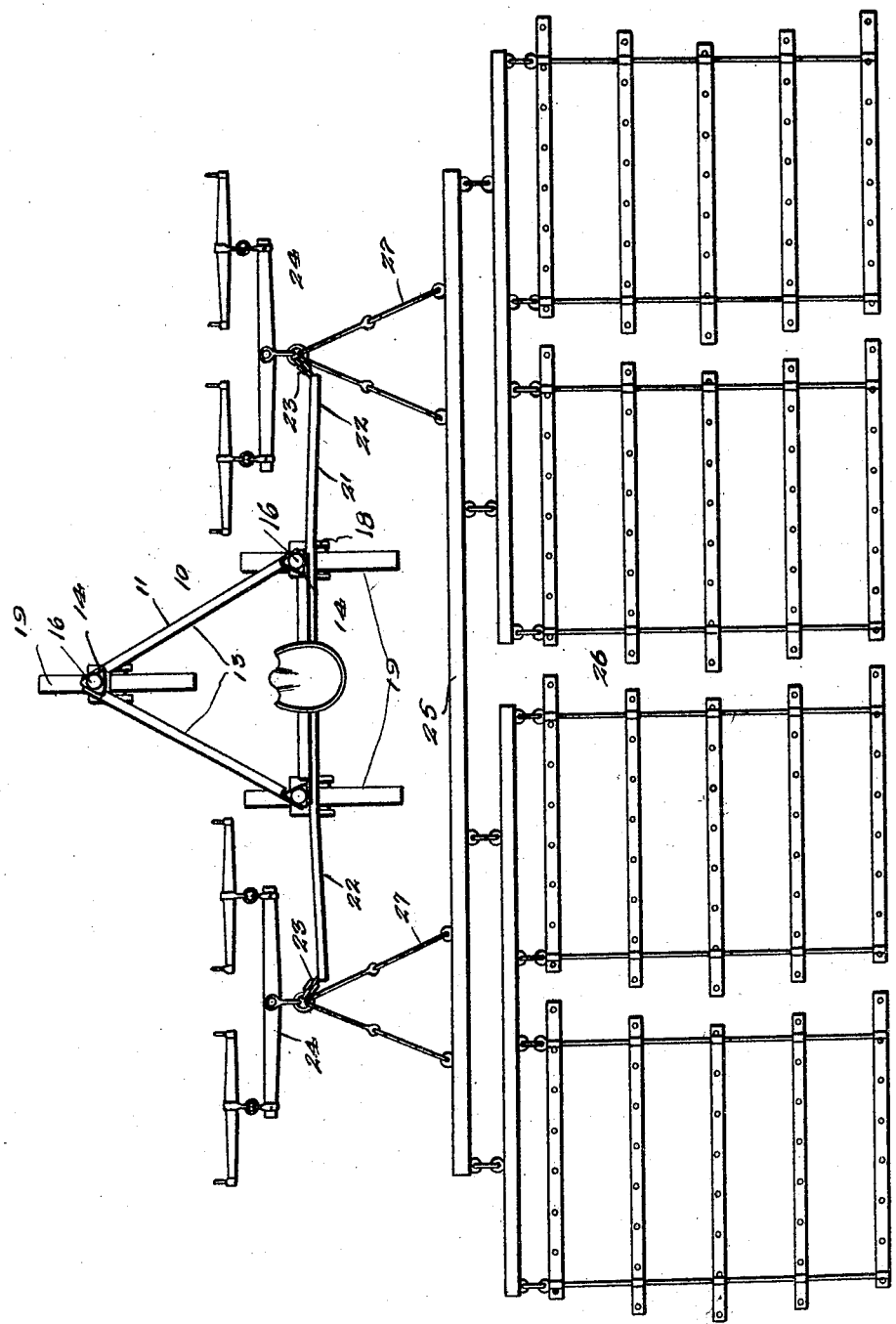

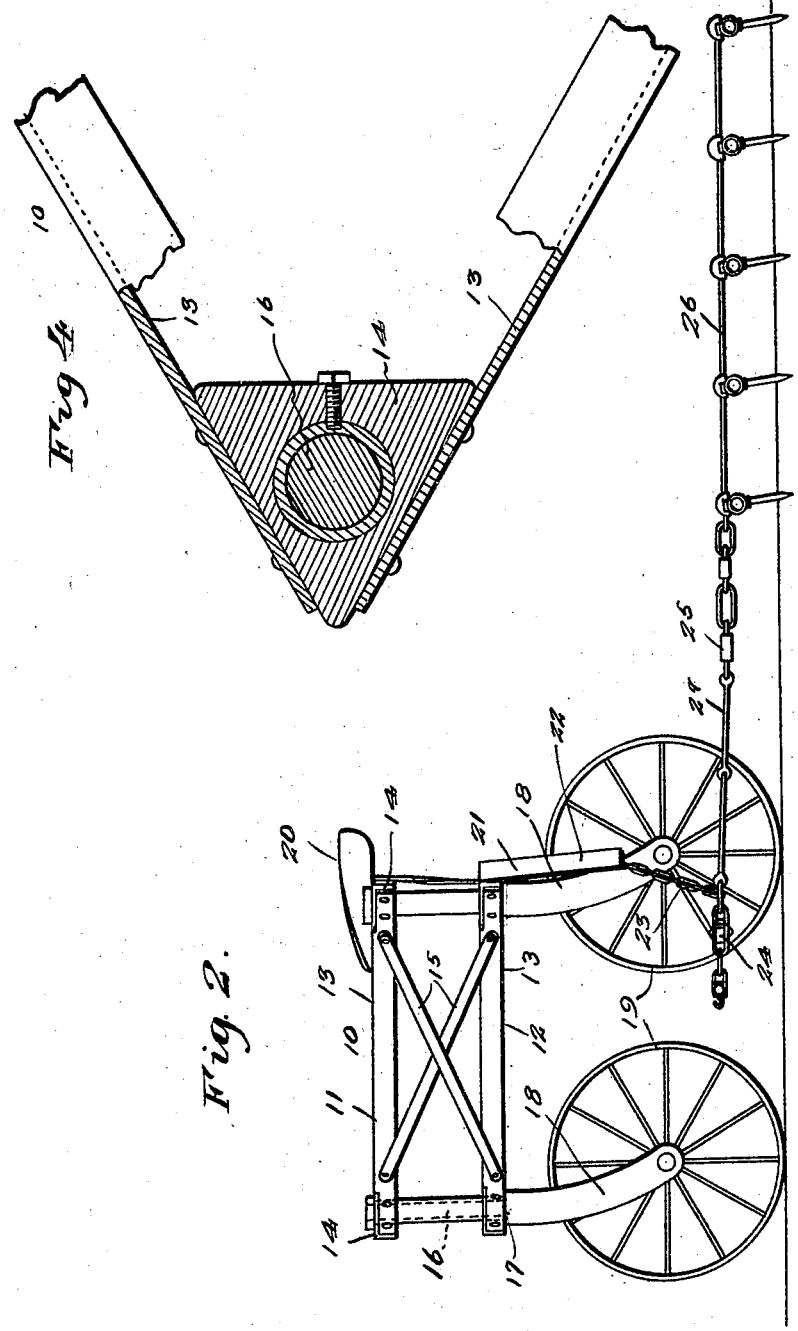

UNITED STATES PATENT OFFICE.

LEWIS F. McFARLAND AND PATRICK B. BODEN, OF WAGNER, SOUTH DAKOTA.

HARROW CART.

1,413,044.   Specification of Letters Patent.   Patented Apr. 18, 1922.

Application filed April 19, 1921. Serial No. 462,631.

*To all whom it may concern:*

Be it known that we, LEWIS F. MCFARLAND and PATRICK B. BODEN, citizens of the United States, residing at Wagner, in the county of Charles Mix and State of South Dakota, have invented new and useful Improvements in Harrow Carts, of which the following is a specification.

This invention relates to carriages or carts for use in connection with harrows and has for an object the provision of a vehicle wherein the driver may ride in front of the harrow and thus avoid the dust and dirt usually experienced in harrowing. In addition, this position of the carriage lightens the draft and renders handling of the draft animals easier.

Another object of the invention is the provision of a carriage or cart which may be easily and quickly detachably connected to the double trees or other draft gear of a harrow in a manner to maintain a proper distance in advance of the latter and to readily follow the direction of travel without shifting its position laterally, irrespective of the relative positions of the draft gear.

Another object is the provision of means for supporting the carriage in a manner to prevent backward tilting of the same, while the said carriage is being drawn forward.

With the above and other objects in view, the invention further includes the following novel features and details of construction, to be hereinafter more fully described, illustrated in the accompanying drawings and pointed out in the appended claims.

In the drawings:—

Figure 1 is a plan view showing the carriage in position for use in connection with a harrow and illustrating the manner of such connection.

Figure 2 is a side elevation of the same.

Figure 3 is a perspective view of the carriage per se.

Figure 4 is a detail view showing one corner of the frame carriage in section.

Referring in detail to the drawings, wherein like characters of reference denote corresponding parts, the invention is shown as including a frame 10, which is preferably triangular in plan, although this particular frame is not necessary for the successful operation of the invention. This frame is made in two sections and includes an upper section 11 and a lower section 12, each of which comprises horizontal bars 13, which are connected at the apices of the triangles by bearing members 14. The upper and lower frames are spaced apart and are connected by cross braces 15, which serve to maintain the frames in proper spaced relation.

The bearings 14 of the upper and lower frames are arranged in vertical alignment and rotatably mounted in these bearings are standards 16, to the lower ends of which are connected heads 17 upon which the bearings of the lower frame rest. Extending from the heads 17 are forks 18 and mounted upon axles in the lower ends of these forks are caster wheels 19, the said wheels being thus arranged to adjust themselves to the direction of travel. The forks 18 between which the wheels 19 are mounted are preferably inclined downwardly and rearwardly from the heads 17, so as to prevent backward tilting of the carriage when the latter is being drawn in a forward direction. Mounted upon the upper frame is a seat 20 for the accommodation of the driver.

For the purpose of attaching the carriage in position for use, the said carriage has extending across its rear end, a draw bar 21. This bar forms one of the bars of the lower frame 12 and extends beyond each side of the frame and terminates in a downwardly inclined extremity 22, to which is attached a chain 23.

By extending the ends of the draw bar 21 downwardly as shown, they are brought into position for attachment to double trees 24, which will be secured to the draw bar 25 of a harrow 26. Connection is made with the harrow draw bar by any suitable means, such for example as a bridle 27. These bridles are connected near the outer ends of the draw bars 25 so as to provide space between the draft gear for the carriage, the length of the bridles being such as to properly position the carriage in advance of the harrow. The driver is thus located between the draft animals so as to more easily handle the latter and at the same time position them in advance of the dust and dirt arising from the harrowed field. By mounting the frame of the carriage upon the caster wheels, the carriage will more readily accommodate itself to a change in the direction of travel and at the same time maintain its proper position between the draft gear.

The invention is susceptible of various changes in its form, proportions and minor details of construction and the right is herein reserved to make such changes as properly fall within the scope of the appended claims.

Having described the invention what is claimed is:—

1. The combination with a harrow having a draft gear secured to the front of the same near each end and arranged in spaced relation, of a carriage adapted to be positioned in front of the harrow between the draft gear and means for connecting the carriage to said gear.

2. The combination with a harrow having draft gear secured to the front of the same near each end and arranged in spaced relation, of a carriage adapted to be positioned in front of the harrow between the draft gear and means extending beyond each side of the carriage for detachable connection with said gear.

3. The combination with a harrow having a draft gear secured to the front of the same near each end and arranged in spaced relation, of a carriage adapted to be positioned in front of the harrow between the draft gear, means for connecting the carriage to said gear and means included in the carriage, whereby relative movement of the draft gear will not change the position of the carriage with respect to the gear.

4. The combination with a harrow having a draft gear secured to the front of the same near each end and arranged in spaced relation, of a carriage adapted to be positioned in front of the harrow between the draft gear, said carriage including a frame, caster wheels supporting the frame and means for connecting the carriage to the draft gear.

5. The combination with a harrow having a draft gear secured to the front of the same near each end and arranged in spaced relation, of a carriage adapted to be positioned in front of the harrow between the draft gear, said carriage including a frame, caster wheels supporting the frame, a draw bar extending across the carriage beyond each side thereof and means for connecting the draw bar to the draft gear.

6. The combination with a harrow having a draft gear secured to the front of the same near each end and arranged in spaced relation, of a carriage adapted to be positioned in front of the harrow between the draft gear, said carriage including a frame, caster wheels supporting the frame, the axles of said wheels being disposed rearwardly with respect to their pivotal connection with the frame, a draw bar extending across the carriage beyond each side thereof and means for connecting the draw bar to the draft gear.

In testimony whereof we affix our signatures.

LEWIS F. McFARLAND.
PATRICK B. BODEN.